(12) United States Patent
Voege

(10) Patent No.: US 9,925,608 B2
(45) Date of Patent: Mar. 27, 2018

(54) DIE STOCK

(71) Applicant: Hartmetall-Werkzeugfabrik Paul Horn GmbH, Tuebingen (DE)

(72) Inventor: Ruediger Voege, Rottenburg (DE)

(73) Assignee: HARTMETALL-WERKZEUGFABRIK PAUL HORN GMBH, Tuebingen (DE)

( * ) Notice: Subject to any disclaimer, the term of this patent is extended or adjusted under 35 U.S.C. 154(b) by 98 days.

(21) Appl. No.: 14/862,973

(22) Filed: Sep. 23, 2015

(65) Prior Publication Data

US 2016/0008902 A1  Jan. 14, 2016

Related U.S. Application Data

(63) Continuation of application No. PCT/EP2014/055403, filed on Mar. 18, 2014.

(30) Foreign Application Priority Data

Mar. 26, 2013 (DE) .......................... 10 2013 103 089

(51) Int. Cl.
*B23G 5/08* (2006.01)
*B23G 1/44* (2006.01)
*B23G 5/04* (2006.01)

(52) U.S. Cl.
CPC .............. *B23G 5/083* (2013.01); *B23G 1/44* (2013.01); *B23G 5/04* (2013.01); *B23G 2200/06* (2013.01);
(Continued)

(58) Field of Classification Search
CPC . B23G 1/44; B23G 5/04; B23G 5/083; B23G 2200/06; B23G 2200/08;
(Continued)

(56) References Cited

U.S. PATENT DOCUMENTS 1,883,334 A * 10/1932 Borden ..................... B23G 5/08
408/186
1,906,176 A * 4/1933 Newman ................... B23G 5/10
408/197
(Continued)

FOREIGN PATENT DOCUMENTS

CN     2461688 Y     11/2001
CN     2587564 Y     11/2003
(Continued)

OTHER PUBLICATIONS

Examination Report for corresponding Chinese Patent Application No. 201480022465.5, dated Jul. 21, 2016.
(Continued)

*Primary Examiner* — Eric A Gates
(74) *Attorney, Agent, or Firm* — Jason H. Vick; Sheridan Ross, PC

(57) ABSTRACT

A die stock comprising a holder, which is symmetrical to a centric holder longitudinal axis, wherein the holder has a plurality of receiving grooves each of which is configured for receiving a cutting insert and a clamping wedge, each of the receiving grooves extending from a first end face of the holder in the axial direction, the first end face running transversely to the axial direction, and wherein each of the receiving grooves extends from an inner side of the holder in a radial direction, the inner side facing toward the holder longitudinal axis. The die stock further comprises a plurality of cutting inserts, wherein each cutting insert has, on a front side that faces substantially toward the holder longitudinal axis, at least one cutting edge. The die stock further comprises a plurality of clamping wedges arranged detachably in the receiving grooves.

10 Claims, 6 Drawing Sheets

(52) U.S. Cl.
CPC ...... *B23G 2200/08* (2013.01); *B23G 2200/10* (2013.01); *B23G 2200/12* (2013.01); *B23G 2210/08* (2013.01); *B23G 2225/28* (2013.01); *B23G 2225/32* (2013.01); *Y10T 408/90473* (2015.01)

(58) Field of Classification Search
CPC ............ B23G 2200/10; B23G 2200/12; B23G 2210/08; Y10T 408/9046; Y10T 408/90473
USPC ...................................... 470/66, 80, 185, 187
See application file for complete search history.

(56) References Cited

U.S. PATENT DOCUMENTS

| | | | |
|---|---|---|---|
| 2,152,567 A | | 3/1939 | Reimschissel |
| 2,174,467 A | | 9/1939 | Knight et al. |
| 2,239,736 A | * | 4/1941 | Reimschissel ........... B23G 5/10 408/116 |
| 2,517,062 A | * | 8/1950 | Vosper ..................... B23G 5/08 407/49 |
| 6,877,934 B2 | * | 4/2005 | Gainer ..................... B23G 1/34 407/49 |
| 2014/0017020 A1 | | 1/2014 | Luik |

FOREIGN PATENT DOCUMENTS

| | | | | |
|---|---|---|---|---|
| CN | 2873386 Y | 2/2007 | | |
| CN | 102481639 A | 5/2012 | | |
| DE | 102005010145 A1 | 9/2006 | | |
| DE | 102009038133 A1 | 2/2011 | | |
| DE | 102011013789 B3 | * | 6/2012 | ............... B23G 5/04 |
| DE | 202012103423 U1 | 10/2012 | | |
| GB | 406892 | 3/1934 | | |
| GB | 414579 | 8/1934 | | |
| WO | WO 2004067216 A1 | * | 8/2004 | ............... B23G 5/18 |
| WO | WO 2011/018210 | 2/2011 | | |
| WO | WO 2012/117033 | 9/2012 | | |

OTHER PUBLICATIONS

International Search Report for International Application No. PCT/EP2014/055403, dated Jun. 3, 2014.
Written Opinion for International Application No. PCT/EP2014/055403, dated Jun. 3, 2014.
International Preliminary Report on Patentability for International Application No. PCT/EP2014/055403, dated Oct. 8, 2015.
Notification of Reasons for Rejection (Including Translation) for Japanese Patent Application No. 2016-504569 dated Apr. 4, 2017.

* cited by examiner

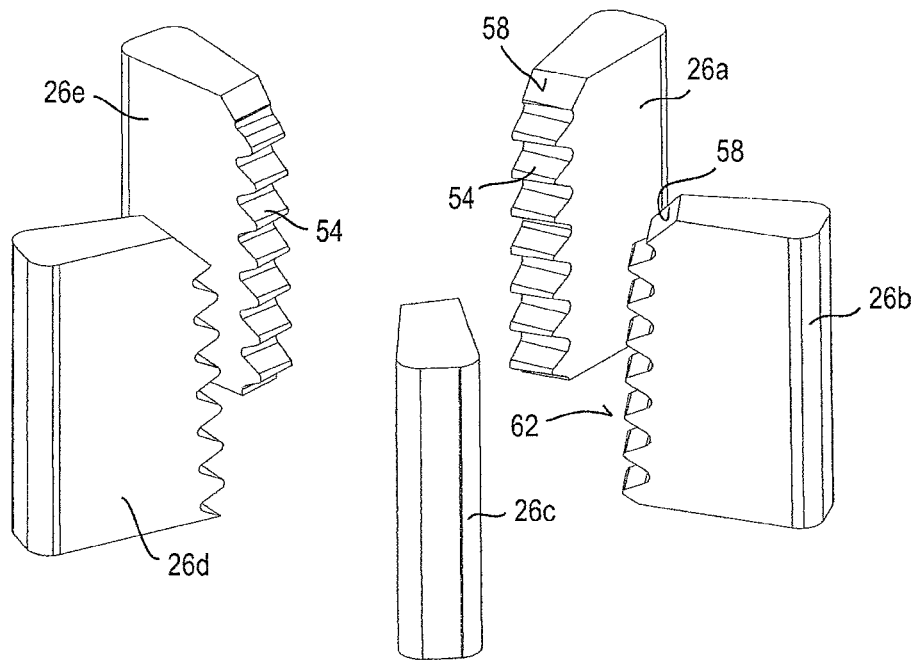
Fig. 5
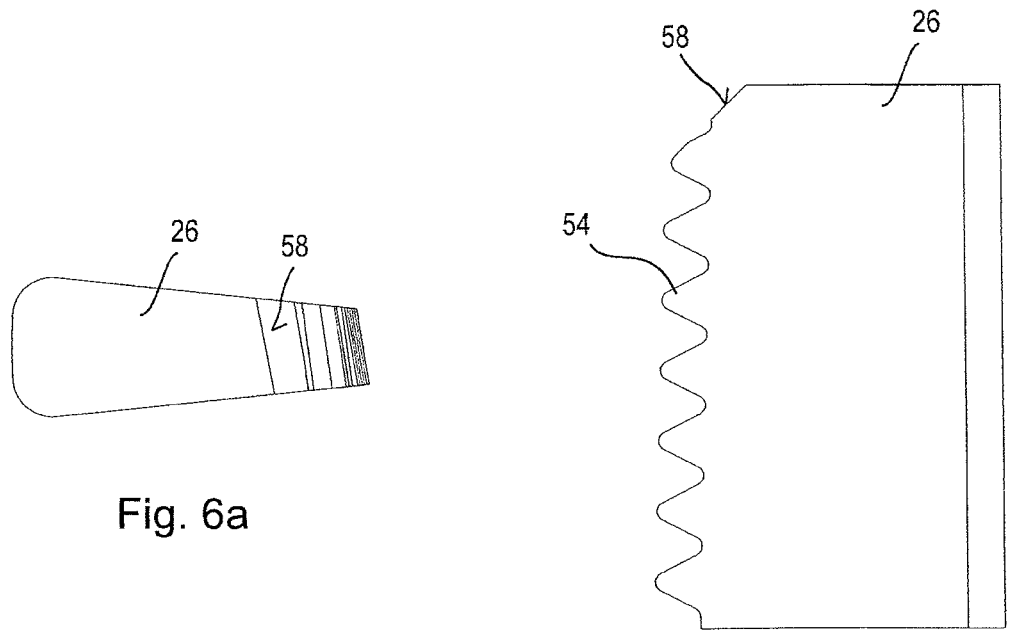
Fig. 6a
Fig. 6b

US 9,925,608 B2

DIE STOCK

CROSS REFERENCES TO RELATED APPLICATIONS

This application is a continuation of international patent application PCT/EP2014/055403, filed on Mar. 18, 2014 designating the U.S., which international patent application has been published in German language and claims priority from German patent application DE 10 2013 103 089.0, filed on Mar. 26, 2013. The entire contents of these priority applications are incorporated herein by reference.

BACKGROUND OF THE INVENTION

This disclosure relates to a die stock comprising a substantially cylindrical holder, which is symmetrical to a centric holder longitudinal axis that runs in an axial direction, and has a plurality of receiving grooves each of which is configured for receiving a cutting insert and a clamping wedge, wherein each of the receiving grooves extends from a first end face of the holder in the axial direction, said first end face running transversely to the axial direction, and wherein each of the receiving grooves extends from an inner side of the holder in a radial direction, said inner side facing toward the holder longitudinal axis, wherein a plurality of cutting inserts are provided that are arranged detachably in the receiving grooves, wherein each cutting insert has, on a front side that faces substantially toward the holder longitudinal axis, at least one cutting edge. This disclosure further relates to a holder and a cutting insert for such a die stock.

An exemplary die stock of this generic type is known from WO 2012/117033 A1.

Die stocks, often also referred to as screw dies, are frequently used for machining of external threads and are known in various embodiments. In one embodiment, the die stocks are realized in one piece as a HSS (High Speed Steel) tool. Although these are inexpensive to produce, they are limited in performance and uneconomical due to low cutting data. In addition, if a cutting edge is damaged, the entire die stock has to be exchanged.

Furthermore, die stocks which are made fully of hard metal as a one-piece tool are known. These provide a better performance, but are very expensive and complex in terms of production.

In addition, die stocks having exchangeable cutting inserts are known. These have in principle, however, fewer cutting inserts than the above-stated HSS die stocks and hard metal die stocks, owing to the fitting space conditions. Moreover, because of the necessary space for insertion of the cutting inserts, such die stocks generally provide unfavorable stability of the tool. Examples thereof are known from U.S. Pat. Nos. 2,174,467 A, 2,152,567 A and from GB 406,892 A. In these die stocks, the handling for exchange of the cutting inserts is relatively complex, however. Also the positioning of the individual cutting inserts relative to one another here appears to be quite complex. A further main problem consists in guaranteeing an optimally stable and exactly defined insert fit of the cutting inserts in the die stock holder. In the last-named examples, however, this cannot be assumed.

SUMMARY OF THE INVENTION

It is thus an object to provide an alternative die stock in which the exchangeable cutting inserts can be easily fitted and removed, at the same time as a secure insert fit is guaranteed and, moreover, improved machining characteristics are enabled.

In view of this object, a die stock is provided which comprises:
- a substantially cylindrical holder, which is symmetrical to a centric holder longitudinal axis that runs in an axial direction, wherein the holder has a plurality of receiving grooves each of which is configured for receiving a cutting insert and a clamping wedge, wherein each of the receiving grooves extends from a first end face of the holder in the axial direction, said first end face running transversely to the axial direction, and wherein each of the receiving grooves extends from an inner side of the holder in a radial direction, said inner side facing toward the holder longitudinal axis,
- a plurality of cutting inserts arranged detachably in the receiving grooves, wherein each cutting insert has, on a front side that faces substantially toward the holder longitudinal axis, at least one cutting edge,
- a plurality of clamping wedges arranged detachably in the receiving grooves in order to axially and radially fix the cutting inserts, wherein one clamping wedge and one cutting insert is provided for each of the receiving grooves, respectively, wherein the clamping wedges are, in a peripheral direction that runs transversely to the axial direction and the radial direction, arranged alongside the cutting inserts in each of the receiving grooves, respectively, and by
- one holding means per receiving groove, for fastening the clamping wedges and cutting inserts in the receiving grooves.

According to a further aspect, a holder for such a die stock is provided, wherein the holder:
- is substantially cylindrical and is symmetrical to a centric holder longitudinal axis that runs in an axial direction,
- has a plurality of receiving grooves each of which is configured for receiving a cutting insert and a clamping wedge, wherein each of the receiving grooves extends from a first end face of the holder in the axial direction, said first end face running transversely to the axial direction, and wherein each of the receiving grooves extends from an inner side of the holder in a radial direction, said inner side facing toward the holder longitudinal axis,
- a plurality of clamping wedges arranged detachably in the receiving grooves in order to axially and radially fix the cutting inserts, wherein one clamping wedge is provided for each of the receiving grooves, respectively, wherein the clamping wedges may in a peripheral direction be arranged alongside the cutting inserts in each of the receiving grooves, respectively, said peripheral direction running transversely to the axial direction and the radial direction, and
- one holding means per receiving groove, for fastening the clamping wedges in the receiving grooves.

According to a still further aspect, a cutting insert for such a die stock is provided, wherein the cutting insert:
- has on a front side facing substantially toward the holder longitudinal axis at least one cutting edge,
- has orthogonally to the axial direction a cross-sectional profile which, starting from the front side, widens along the radial direction outward in a wedge-shaped manner, and
- is axially and radially fixable in one of the receiving grooves of the holder by means of one of the clamping wedges, wherein the cutting insert, in the peripheral direction running transversely to the axial direction and the radial direction, can be arranged alongside one of the clamping wedges in each of the receiving grooves, respectively.

Through the use of the above-described clamping wedges, an optimal insert fit is achieved. The clamping wedges ensure a wedge clamping of the individual cutting inserts. As a result, when the holding means are tightened, a self-locking force closure is respectively created between the cutting insert, the respective clamping wedge and the respective receiving groove, which force closure fixes the individual cutting inserts axially and radially in the respective receiving groove. An unintentional detachment of the fixedly inserted cutting inserts during the machining is thereby practically impossible. The clamping of the individual cutting inserts is hence extremely stable.

Unlike the above-stated die stocks known from the prior art, the clamping wedges do not as usual press in the axial direction from above onto the cutting inserts. The clamping wedges are arranged in the peripheral direction, i.e. transversely to the axial and radial direction, alongside the cutting inserts in the respective receiving groove. The word "transversely" is in this regard preferably understood to mean orthogonally. In contrast to clamping wedges mounted axially from above onto the cutting inserts, such lateral clamping wedges arranged next to the cutting inserts enable improved fixing of the cutting inserts in the receiving grooves both in the axial direction and in the radial direction.

A further advantage of the clamping wedges and of their arrangement alongside the cutting inserts consists in the fact that production tolerances of the cutting inserts can hereby be compensated in a simple manner. Depending on the shape and taper of the clamping wedges, small distance tolerances in the axial and radial direction can thereby be compensated. In clamping plates which are pressed in the axial direction from above onto the cutting inserts, this tends not to be possible.

The above-stated object is therefore achieved in full.

According to a refinement, the cutting inserts respectively have orthogonally to the axial direction a cross-sectional profile which, starting from the front side, widens along the radial direction outward in a wedge-shaped manner.

With the cutting inserts clamped in place, said cross-sectional profile thus becomes wider with increasing distance from the holder longitudinal axis. Preferably, the cross-sectional profile widens continuously in this direction (radial direction). This produces on the cutting inserts planar side surfaces or contact surfaces, which, in the state clamped into the holder, run preferably parallel to the holder longitudinal axis. In the clamped state, one of these contact surfaces bears against a corresponding, planar contact surface of the receiving groove. The opposite contact surface, running obliquely (i.e. at a defined angle) thereto, bears by contrast against a planar contact surface of the respective clamping wedge, which is arranged in the same receiving groove.

At this point, it should be pointed out that it would also in principle be possible to arrange a plurality of cutting inserts or a plurality of clamping wedges in the same receiving groove. Preferably, however, it is provided that only one cutting insert and only one clamping wedge are arranged in each of the receiving grooves, respectively.

In a further refinement, it is provided that each of the receiving grooves, starting from the inner side of the holder, widens along the radial direction in a wedge-shaped manner, with increasing distance from the holder longitudinal axis. Moreover, each of the receiving grooves preferably, starting from the first end face of the holder (running orthogonally to the axial direction), tapers along the axial direction in a wedge-shaped manner.

Correspondingly, it is also provided that each of the clamping wedges, viewed from the first end face of the holder, tapers along the axial direction in a wedge-shaped manner and, starting from the inner side of the holder, widens along the radial direction outward in a wedge-shaped manner.

As a result of this refinement, a type of double wedge is thus created. As described above, the clamping wedges as well as the receiving grooves are configured in a wedge-shaped manner, viewed both in the axial direction and in the radial direction. As a result, the cutting inserts, upon tightening of the holding means, are automatically clamped into the holder, both in the axial and in the radial direction. In neither of the two directions is a detachment of the cutting inserts possible. As also described above, the cutting inserts, also in the peripheral direction (orthogonally to the axial and radial direction), are fixedly clamped between the respective receiving groove and the clamping wedge respectively arranged therein.

According to a further refinement, the cutting inserts are differently configured. The cutting inserts preferably have different cutting edge geometries, such that the cutting edges of the individual cutting inserts form different peripheral segments of a thread.

Although identical cutting inserts could also in principle be used, the advantage of using different cutting inserts consists in the fact that the geometry of an external thread on the cutting inserts, which external thread is to be produced with the die stock, can then be depicted still better. As already mentioned, the cutting inserts are distributed in the peripheral direction on the holder. In order to still better depict the geometry of the yet to be produced external thread on the cutting inserts, it is therefore advantageous that the cutting edge geometry of the individual cutting inserts is adapted in accordance with the position of the respective cutting inserts in the holder.

According to this refinement, it is therefore important that the user fits the individual, different cutting inserts in the correct order on the holder. In order to make this easier for the user, the individual cutting inserts, as well as the corresponding receiving grooves on the holder, are labeled, for instance by a numerical numbering.

In contrast to the die stock which is stated in the introduction and described in WO 2012/117033 A1 and which uses identical cutting inserts, the use of different cutting inserts has the advantage that all cutting inserts can simultaneously engage with the workpiece to be machined, rather than that just one cutting insert initially (in the starting cut) enters into engagement with the workpiece. As a result, also the force distribution to the individual cutting inserts, in particular in the starting cut, is thus significantly improved.

According to a further aspect of the disclosure, a set of a plurality of cutting inserts for the above-mentioned type of die stock is presented, wherein the individual cutting inserts of the set:

each have on a front side at least one cutting edge and orthogonally to the axial direction a cross-sectional profile which, starting from the front side, widens along the radial direction outward in a wedge-shaped manner, have different cutting edge geometries, such that the cutting edges of the cutting inserts form different peripheral segments of a thread, and each are axially and radially fixable in one of the receiving grooves of the holder by means of one of the clamping wedges and, in a peripheral direction running transversely to the axial direction and the radial direction, can be arranged alongside one of the clamping wedges in one of the receiving grooves.

In a further refinement, each cutting insert has a chamfer, which is located in a region of the first end face of the holder when the cutting inserts are arranged in the holder, wherein the normal vectors of the chamfers point toward the holder longitudinal axis and the chamfers lie on a common imaginary envelope cone.

Of course, the abovementioned normal vectors serve merely to describe the spatial position of the chamfers, i.e. do not in reality exist or are not visible. The normal vectors of the individual chamfers should be oriented such that they intersect the holder longitudinal axis when the cutting inserts are clamped in place. To put it another way, the chamfers are configured such that, in the clamped state of the cutting inserts, they face toward the central axis of symmetry of the holder. Due to the above-described different cutting edge geometry of the individual cutting inserts, also different chamfers result therefrom.

The chamfers can essentially also be referred to as lead-in chamfers. They are preferably formed by planar surfaces, which in the inserted state of the cutting inserts run obliquely to the holder longitudinal axis. The lead-in chamfers or chamfers facilitate the fitting of the die stock on the starting cut end of the workpiece to be machined. Since the chamfers of the cutting inserts, as described above, lie on a common imaginary envelope cone, the workpiece to be machined can be fitted relatively easily and in a positionally exact manner on the die stock (or, vice versa, also the die stock fitted on the workpiece). The arrangement on a common imaginary envelope cone prevents, in particular, catching or undesirable oblique fitting of the workpiece on the die stock (or the die stock on the workpiece) during this process.

According to a further refinement, it is preferably provided that the receiving grooves are identical, and wherein each of the receiving grooves has a bearing surface that runs transversely to the holder longitudinal axis, for supporting one of the cutting inserts, wherein the bearing surfaces are arranged at the same axial height, and wherein the cutting inserts are equal in length in the axial direction.

Said bearing surfaces run preferably orthogonally to the holder longitudinal axis, but they can in principle, however, also run obliquely thereto. Thus, "transversely" is here once again understood as "obliquely" or as "at a defined angle" (non-parallel), yet preferably orthogonally. However, the cutting inserts preferably have an identical axial height and bear at the same axial height against the holder. The upper ends of the individual cutting inserts (workpiece-side ends) thus likewise come to lie at the same axial height. In the initial cutting of the workpiece, each cutting insert is thus brought immediately into engagement, i.e. equally loaded, so that the individual cutting inserts support one another during the cutting process.

According to a further refinement, the fastening means are screws having an external thread, which screws are insertable from a second end side of the holder into bores provided in the holder, said second end side being arranged opposite the first end side of the holder, and which screws are screwable to the clamping wedges via corresponding internal threads which are provided in the clamping wedges and correspond with the external threads.

The screwing for the fixing of the clamping wedges, and thus also of the cutting inserts, is thus effected, so to speak, from the bottom. Instead of pressing fastening plates in the axial direction from above onto the cutting inserts, as is otherwise customary, the clamping wedges are drawn in the opposite direction into the receiving grooves. On the one hand, this allows better metering of the clamping force, as well as an accompanying exacter positioning of the clamping wedges. On the other hand, this saves on fitting space which is necessary in the region of the first end face of the holder (work-piece-side end face of the holder) and which would otherwise have to be provided at this location for the screw heads. In addition, a collision of the fastening means with the workpiece is thereby effectively precluded.

In a further refinement, the holder is of two-part construction, has a first holder part, in which the receiving grooves are provided, and additionally has a second holder part, which serves to fasten the holder to a workpiece fixture and, with the aid of the fastening means, is fastenable to the first holder part.

Even though, in principle, a single-part construction of the holder is technically equally possible, a two-part construction of the holder enormously simplifies the production. The holder can thereby be produced by means of wire-cut EDM instead of by means of the more complex die sinking process. This is substantially due to the fact that the first holder part, in which the receiving grooves are provided, is separated from the second holder part, in which recesses for the screw heads are provided. The different geometries of the two holder parts can thus be produced separately. A countersink, which is complex and expensive to produce and which would be necessary for the production of a single-part holder, can thereby be dispensed with.

In the preferably two-part construction of the holder, the above-described screwing from the bottom performs several functions. The screws (fastening means) serve, on the one hand, for the fixing of the clamping wedges, and thus also of the cutting inserts. On the other hand, the screws also at the same time hold the two parts of the holder together.

In a further refinement, for the connection of the two holder parts there is provided at least one driving pin, which is inserted in a precisely fitting manner in a through hole, running in the axial direction, in the holder.

Instead of just one driving pin, a plurality of such driving pins can also, of course, be used. Preferably, two driving pins are used. These driving pins serve for the force transmission between the two separate holder parts in a two-part construction of the holder. They transmit the torque from the second holder part, which is clamped in the tool fixture and is rotationally driven, to the first holder part, on which are arranged the cutting inserts with which the workpiece is machined. They here serve to relieve the load on the fastening means (screws), which, in the event of such additionally used driving pins, are subjected merely to tensile load and not to shearing load. A form closure between driving pins and holder is better suited to the transmission of the torque than a force closure between screws and holder.

The above-stated features and the features which have yet to be set out below can be used not only in the respectively stated combination, but also in other combinations or in isolation, without departing from the spirit and scope of the present invention.

BRIEF DESCRIPTION OF THE DRAWINGS

FIG. 5 shows a set of different cutting inserts which are used in the die stock, FIGS. 6a and 6b show a top view (FIG. 6a) and a side view (FIG. 6b) of such a cutting insert.

DESCRIPTION OF PREFERRED EMBODIMENTS

Figure 1:
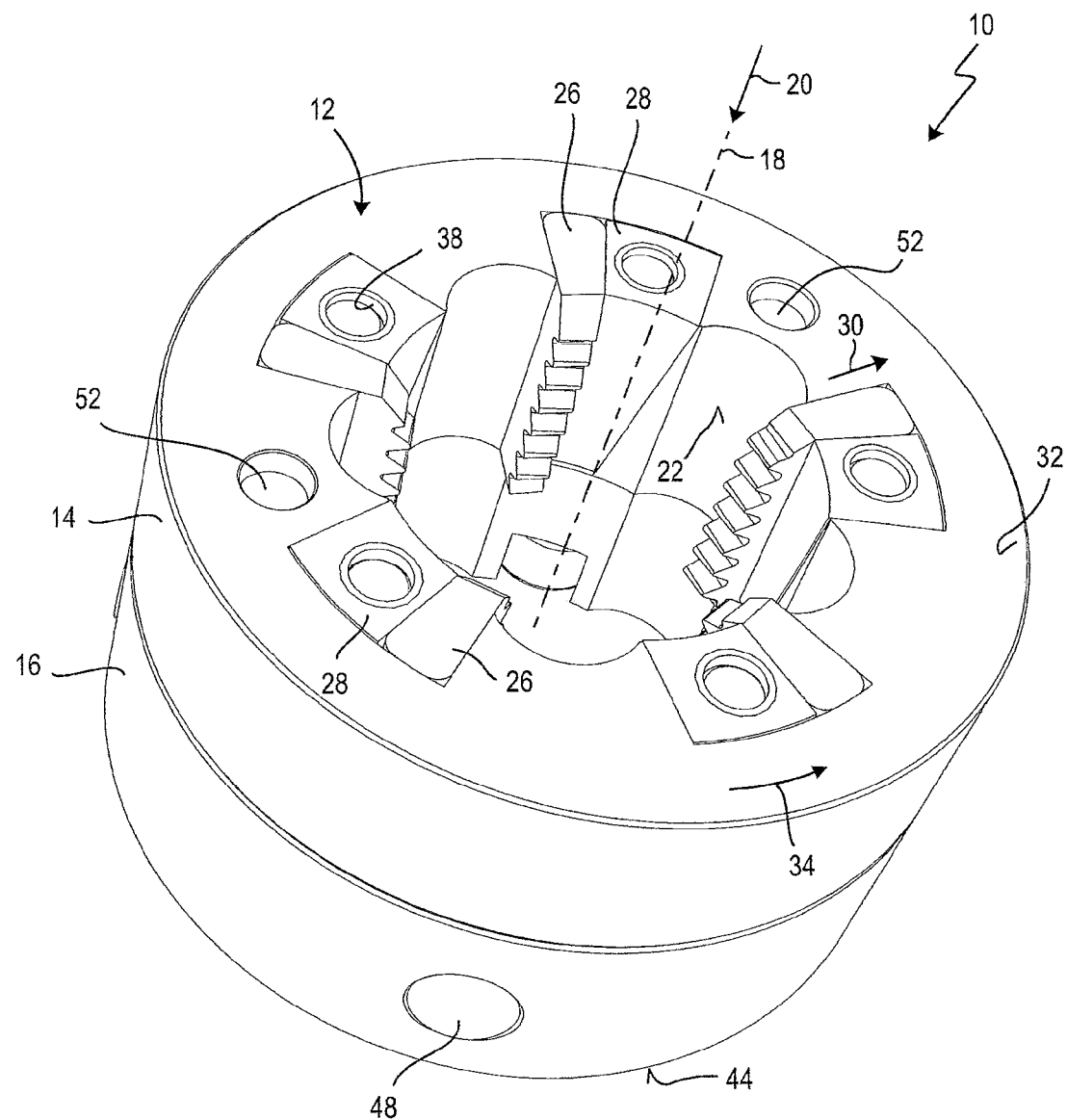
FIG. 1 shows a perspective view of one embodiment of a die stock.

FIG. 1 shows a perspective view of a preferred embodiment of the die stock according to the present disclosure, which is therein denoted in its entirety with the reference numeral 10. The die stock 10 has a substantially cylindrical holder 12, which in the shown illustrative embodiment is of two-part configuration and comprises two holder parts, a first holder part 14 and a second holder part 16. In principle, a one-piece construction of the holder 12 is also conceivable. Similarly, a multipiece construction consisting of three or more parts would also be possible.

The description of the shape of the holder, "substantially cylindrical", relates in the present case mainly to its outer contour. As can be seen from the figures, the inner contour of the holder 12 partially deviates from the cylindrical form.

Figure 2A:
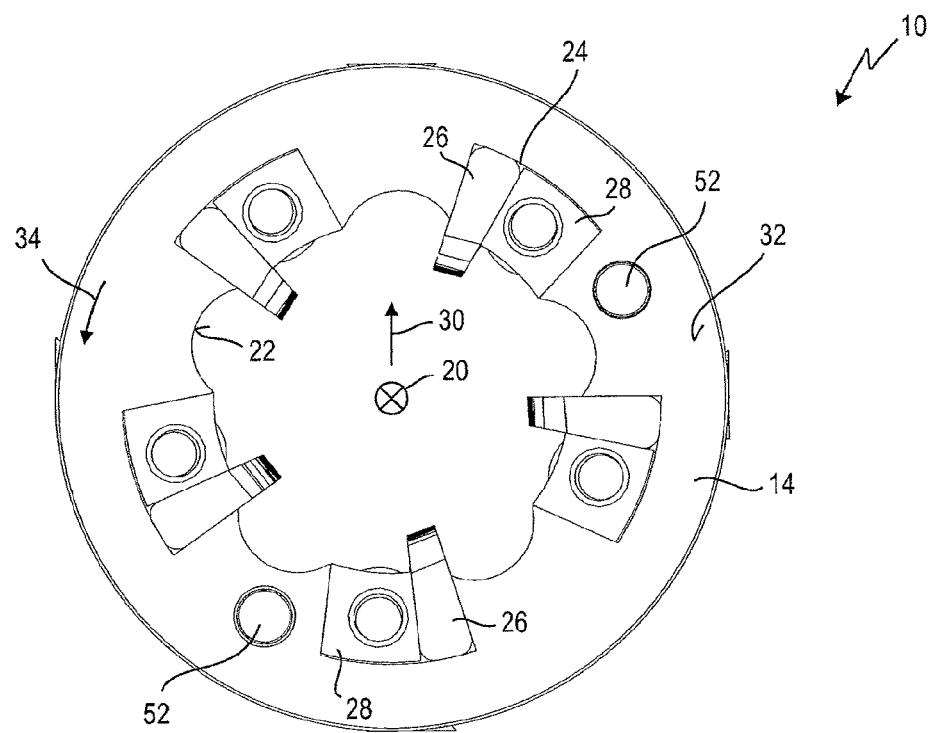
FIGS. 2a and 2b show top views of the embodiment shown in FIG. 1, from above (FIG. 2a) and below (FIG. 2b)

The holder 12 of the die stock 10 is constructed symmetrically in relation to a holder longitudinal axis 18 running centrally, in the axial direction 20. On the inner side 22 of the holder 12 are provided a plurality of receiving grooves 24 (in this illustrative embodiment five), which each serve to receive a respective cutting insert 26 and a respective clamping wedge 28 (see, for instance, FIG. 2a and FIG. 3).

The receiving grooves 24 respectively extend substantially in two directions. On the one hand, they extend from a workpiece-side end face 32 running orthogonally to the holder longitudinal axis 18 (termed the first end face 32) of the holder 12 in the axial direction 20 into the holder 12. On the other hand, they extend from the inner side 22 of the holder 12 outward, viewed in the radial direction 30. The receiving grooves 24 here respectively taper, starting from the first end face 32 of the holder 12, along the axial direction 20 in a wedge-shaped manner. By contrast, starting from the inner side 22 of the holder 12, they widen along the radial direction 30 with increasing distance from the holder longitudinal axis 18.

The cutting inserts 26 can be detachably arranged in the receiving grooves 24 and can be fixed therein by means of a clamping wedge 28. As can further be seen from FIG. 1, the clamping wedges 28, for this purpose, are arranged in the peripheral direction 34, i.e. orthogonally to the axial direction 20 and radial direction 30, alongside the cutting inserts 26 in the respective receiving groove 24. Of course, the mentioned directions: axial direction 20, radial direction 30 and peripheral direction 34 respectively run perpendicularly to one another.

Figure 7A:
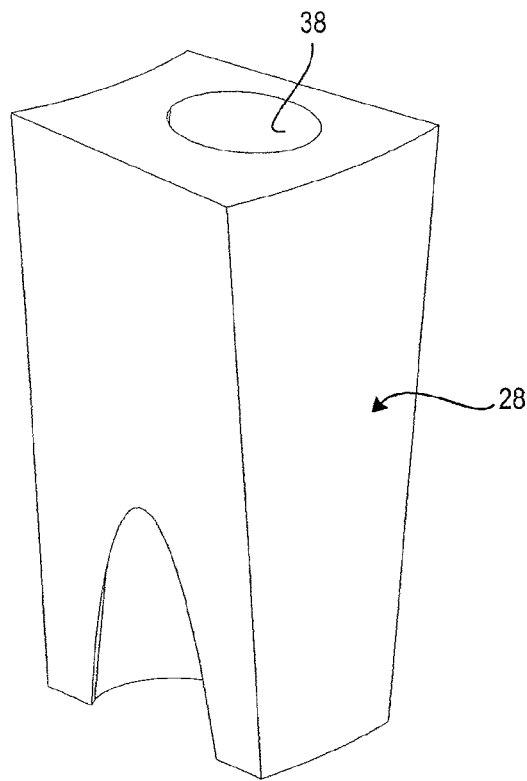
FIGS. 7a and 7b show a perspective view (FIG. 7a) and a top view from above (FIG. 7b) of a clamping wedge for fastening the cutting inserts in the holder of the die stock.
Figure 7B:
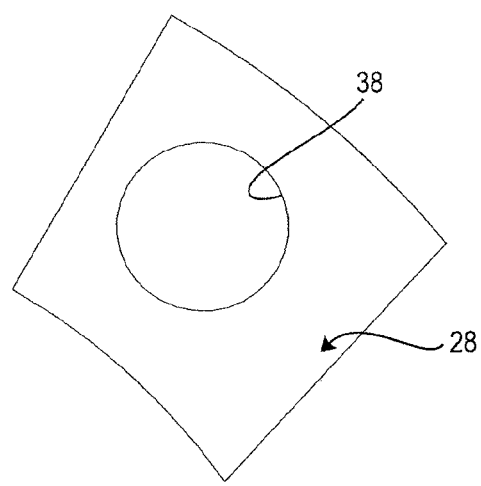

The clamping wedges 28 likewise taper from the first end face 32, viewed along the axial direction 20, and widen, starting from the inner side 22 of the holder 12, viewed along the radial direction 30, outward in a wedge-shaped manner. The clamping wedges 28 therefore have the shape of a double wedge (see, in particular, FIGS. 7a and 7b). This shape of the clamping wedges 28, and their arrangement alongside the cutting inserts 26, guarantees a wedge clamping, whereby the cutting inserts 26 are fixed both in the axial direction 20 and in the radial direction 30. As a result of this wedge clamping, a self-locking force closure is formed between the cutting inserts 26, the respective clamping wedges 28 and the respective receiving groove 24.

Figure 3:
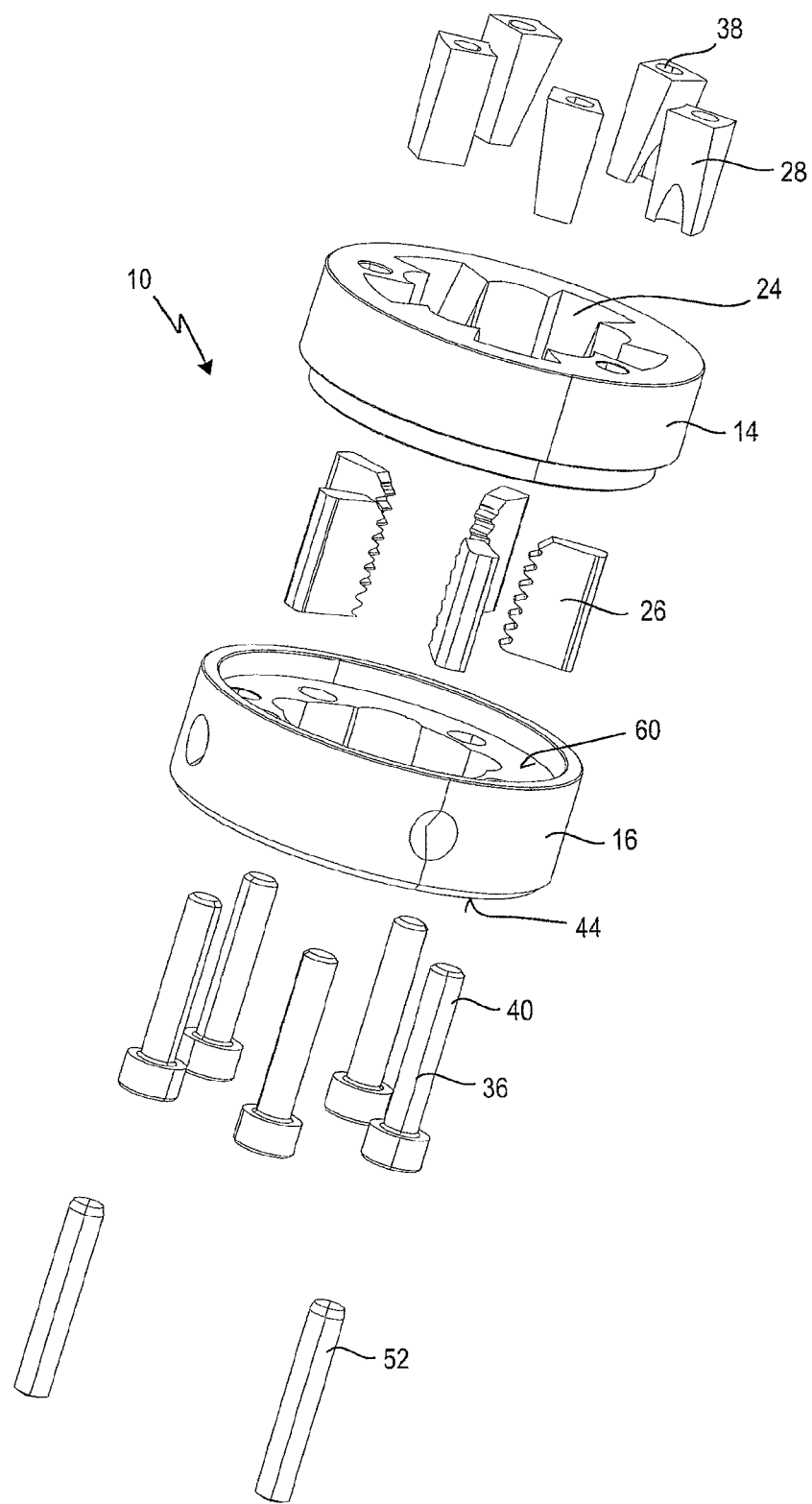
FIG. 3 shows an exploded representation of the embodiment shown in FIG. 1, FIGS. 4a and 4b show perspective views of a first holder part (FIG. 4a) and of a second holder part (FIG. 4b) of the die stock.

The clamping wedges 28 can be fixed to the holder 12 with the aid of fastening elements 36 (see, in particular, FIG. 3). To this end, inside the clamping wedges 28 is respectively provided an internal thread 38, in which the fastening elements 36 can engage with corresponding external threads 40 which are made thereon. As can be seen, in particular, from FIG. 3, the fastening elements 36 engage in the respective clamping wedges 28, in the present case, preferably from the bottom.

Figure 2B:
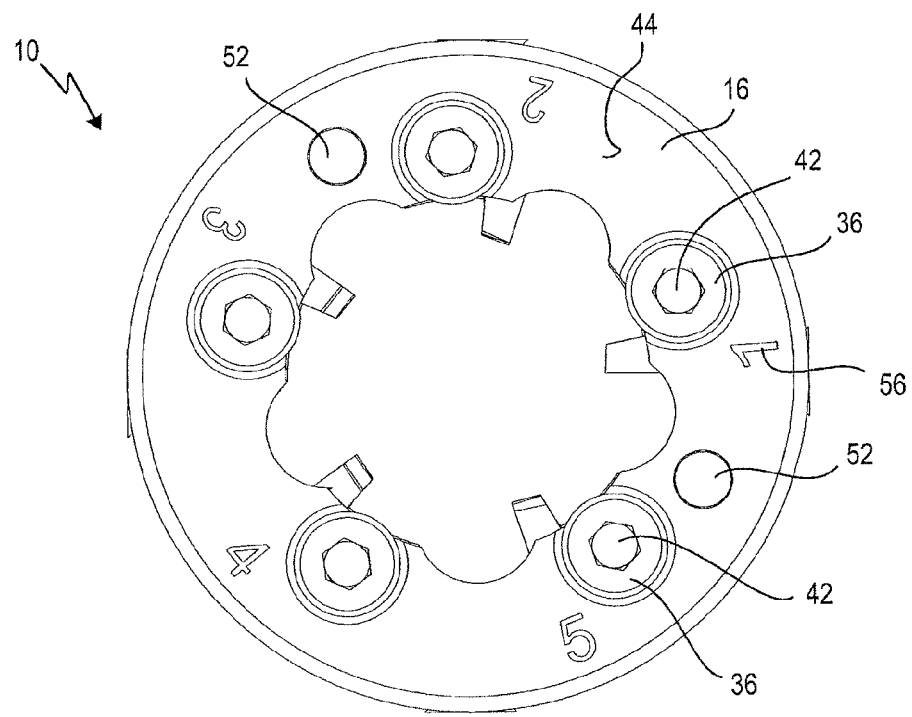
Figure 4A:
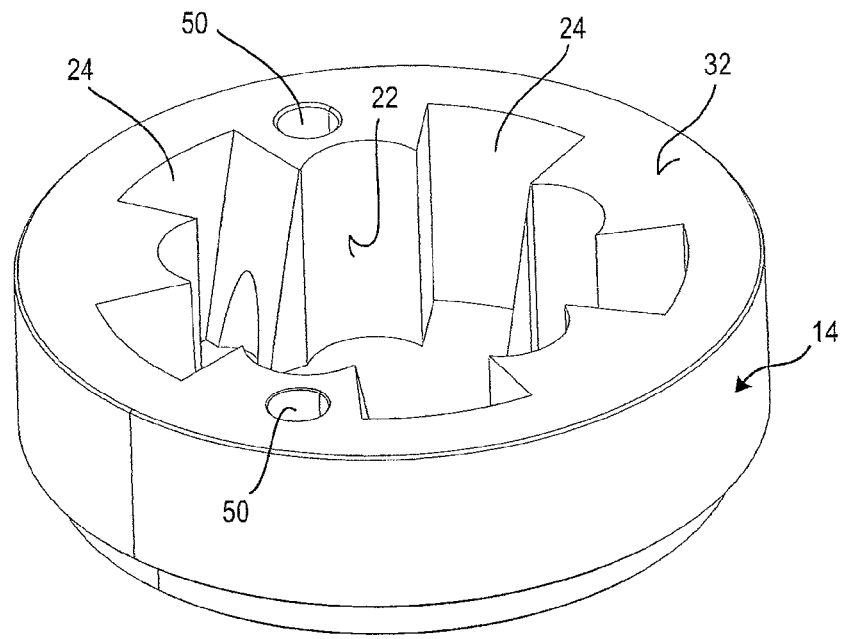
Figure 4B:
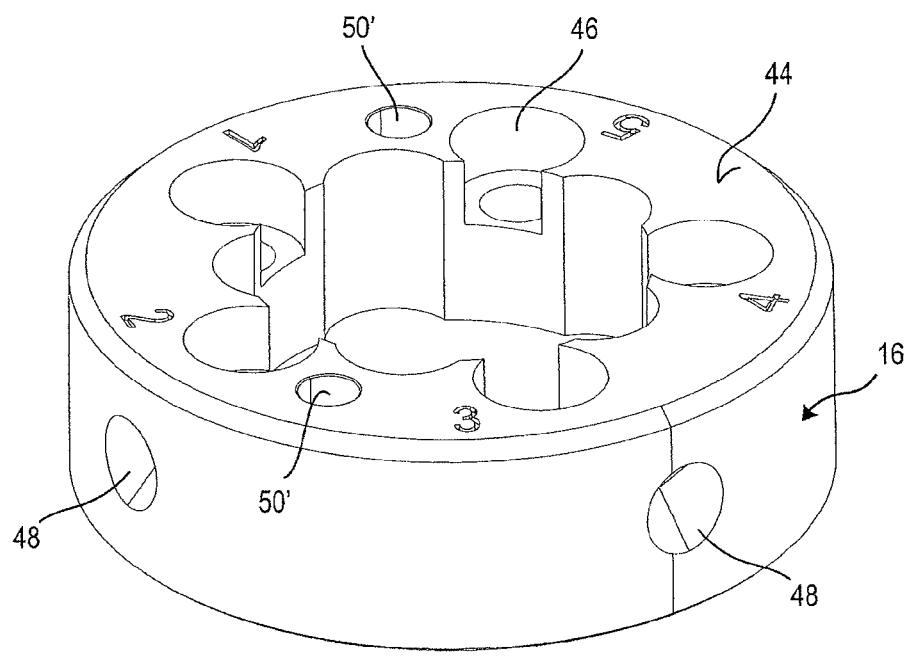

As the fastening elements 36, clamping screws are preferably used, which clamping screws can be equipped, for instance, with a hexagon socket tool engagement member 42. Of course, other tool engagement members are also, however, readily possible. For the fitting of the cutting inserts 26 and of the clamping wedges 28, the clamping screws 36 of the holder-side end face 44 provided on the second holder part 16 (see FIGS. 2b, 3 and 4b) are inserted into the holder 12 and screwed to the clamping wedges 28. Said second end face 44 likewise runs orthogonally to the holder longitudinal axis 18 and lies opposite the first end face 32 arranged on the first holder part. In order to sink the clamping screws 36 in the fitted state as fully as possible in the holder 12, countersunk head bores 46 are made in the second end face 44 of the second holder part 16 (see, in particular, FIG. 4b).

As a result of the screwing from the bottom, no necessary fitting space for the clamping screws 36 is thus required on the workpiece-side end face 32, which proves extremely advantageous, in particular with regard to collisions of the die stock 10 with the workpiece to be machined, which collisions are to be avoided. In addition to the function of fixing the individual clamping wedges 28 in the receiving grooves 24, the clamping screws 36 also hold the two parts 14, 16 of the holder 12 together.

A fundamental advantage of this type of fixing of the clamping wedges 28 consists in the fact that the clamping wedges 28, depending on the taper, can be drawn more deeply or less deeply in the receiving grooves 24. As a result of the defined form closure between the clamping wedges 28, the cutting inserts 26 and the respective receiving groove 24, their end position is, however, exactly defined. Thus, even minor production tolerances of the cutting inserts 26 can be compensated in simple manner. Due to the fixing of the cutting inserts both in the radial direction 30 and in the axial direction 20, a detachment of the cutting inserts 26 during use of the die stock is practically impossible.

During the machining of the workpiece, the die stock 10 is preferably clamped with the second holder part 16 in a tool fixture, for instance in a chuck of a lathe. In order to facilitate clamping, a plurality of engagement members 48 are arranged for this purpose on the periphery of the second holder part 16, which engagement members can be of wedge-shaped configuration, for instance. The torque which is generated in the course of the machining is then transmitted from the second holder part 16 to the first holder part 14, and ultimately to the cutting inserts 26 arranged in the first holder part 14. In order to ensure this torque transmission as optimally as possible, in both holder parts 14, 16 of the holder 12 are provided aligned through holes 50, 50' (see FIGS. 4a and 4b), in each of which a driving pin 52 is inserted in a precisely fitting manner. These driving pins 52 relieve the load on the screws 36, so that the screws 36 are very largely subjected only to tensile load (in the axial direction 20), but not, or not so very much, to shearing load (in the peripheral direction 34).

A further fundamental point of the die stock 10 to the shape and nature of the configuration of the cutting inserts 26. In the present case, a set of five cutting inserts 26 is used (see FIG. 5). Of course, more or fewer cutting inserts 26 would also be possible. In contrast to the clamping wedges 28 and the holder 12, the cutting inserts 26 are preferably made of hard metal. By contrast, the holder 12 and the clamping wedges 28 are, preferably made of steel or HSS. The use of hard metal for the cutting inserts 26 is, in particular, advantageous, given that the cutting inserts 26 constitute the main wearing parts of the die stock 10.

The cutting inserts 26 are preferably constituted by different, i.e. not by identical, cutting inserts 26. Although the cutting inserts 26 have fundamentally equal dimensions (height, length, width), each cutting insert 26 has on its respective front side 62 also at least one cutting edge, preferably a plurality of cutting edges 54. The cutting edge geometry differs, however, from cutting insert to cutting insert. For differentiation purposes, the different cutting inserts in FIG. 5 are therefore denoted by the reference symbols 26a-26e.

The cutting edges 54 of the individual cutting inserts 26a-26e respectively form different peripheral segments of a thread. Since the cutting inserts 26a-26e all enter simultaneously into engagement with the workpiece to be machined, the cutting edge geometry of the individual cutting inserts 26a-26e is adapted in accordance with their position in the holder 12. To put it another way, the cutting edge geometry of the individual cutting inserts 26a-26e would thereby be created if, from a complete internal thread, the contour of which corresponds to the external thread to be created, the segments lying between the cutting inserts 26a-26e are cut out, so that only the individual sub-segments which are depicted as the cutting edge geometry on the individual cutting inserts 26a-26e remain. With such a set of cutting inserts 26a-26e, an external thread can be more easily created than with identical cutting inserts, as is the case, for instance, in respect of the die stock from WO 2012/117033 A1. In the case of the tool which is stated therein, the identical cutting inserts must be mutually offset in terms of height. In particular in the starting cut of the workpiece, this gives the drawback that initially only the uppermost cutting insert acts on the workpiece and the entire force acts initially only on this cutting insert. In the set of cutting inserts 26a-26e, this is not the case, however. Here the cutting forces are distributed, directly from the starting cut, optimally to all the cutting inserts 26a-26e.

Due to the different embodiments of the individual cutting inserts 26a-26e, it is therefore important that the cutting inserts 26a-26e are inserted in the correct order into the holder 12 or into the corresponding receiving grooves 24. The temporal order plays no part, of course, only the positional order. Due to the symmetry of the holder 12, nor does it matter in which receiving groove 24, for instance, the cutting insert 26a is inserted, as long as the cutting insert 26b is inserted into the following receiving groove 24 in the clockwise direction. In order to simplify matters for the user, a numerical marking 56 can therefore, for instance, be applied on the tool-side end side 44, (see FIG. 2b).

A further feature of the cutting inserts 26 relates to the chamfers 58 provided in the upper part of the cutting inserts 26, also referred to as lead-in chamfers. Of course, due to the different cutting edge geometries of the individual cutting inserts 26a-26e, the size of these chamfers 58 also varies from cutting insert to cutting insert. Common to all chamfers 58 is, however, that these face toward the central holder longitudinal axis 18 as soon as the cutting inserts 26a-26e are fixed in the holder 12. Preferably, the normal vectors of the individual chamfers 58 respectively point exactly toward the holder longitudinal axis 18. In the clamped state of the cutting inserts 26a-26e, these thus then lie on a common imaginary envelope cone (not explicitly shown). This has the advantage that, when the die stock 10 is fitted to the workpiece (or vice versa), a wedging of the workpiece in the die stock 10 is effectively avoided. The workpiece is centered automatically, so to speak, due to the chamfers 58 present on the uniform envelope cone.

In order that the chamfers 58, as described above, come to lie on a unitary imaginary envelope cone, the height of the individual cutting inserts 26a-26e, viewed in the axial direction 20, should be as equal as possible. The cutting inserts 26a-26e therefore rest at the same height on the bearing surface 60 running orthogonally to the holder longitudinal axis 18 and provided on the top side of the second holder part 16 (see, in particular, FIG. 3). As a result, all cutting inserts 26a-26e, in the starting cut, enter simultaneously into engagement with the workpiece to be machined.

In summary, it can thus be said that, with the die stock 10, in particular the clamping of the cutting inserts 26 in the holder 12 has managed to be improved. Moreover, the cutting characteristics of the die stock 10 have also been improved. Also the handling for the user is in large parts easier than is the case with the previously known die stocks.

What is claimed is:

1. A die stock comprising:
a substantially cylindrical holder, which is symmetrical to a holder longitudinal axis that runs in an axial direction, wherein the holder has a plurality of receiving grooves, wherein each of the receiving grooves extends from a first end face of the holder in the axial direction, the first end face running transversely to the axial direction, wherein each of the receiving grooves extends from an inner side of the holder in a radial direction, the inner side facing toward the holder longitudinal axis, and wherein each of the receiving grooves, starting from the first end face of the holder, tapers along the axial direction in a wedge-shaped manner and, starting from the inner side of the holder, widens along the radial direction in a wedge-shaped manner with increasing distance from the holder longitudinal axis, a plurality of cutting inserts arranged detachably in the receiving grooves, wherein each cutting insert has, on a front side that faces substantially toward the holder longitudinal axis, at least one cutting edge, wherein each of the cutting inserts has orthogonally to the direction a cross-sectional profile which, starting from the front side, widens along the radial direction outward in a wedge-shaped manner, a plurality of clamping wedges arranged detachably in the receiving grooves in order to axially and radially fix the cutting inserts, wherein one clamping wedge and one cutting insert is arranged in each of the receiving grooves, respectively, wherein the clamping wedges are, in a peripheral direction that runs transversely to the axial direction and the radial direction, arranged alongside the cutting inserts in each of the receiving grooves, respectively, and one screw per receiving groove, for fastening the clamping wedges and cutting inserts in the receiving grooves, wherein each of the screws has an external thread and is insertable from a second end side of the holder into bores provided in the holder, the second end side being arranged opposite the first end side of the holder, wherein the screws are screwable to the clamping wedges via corresponding internal threads which are provided in the clamping wedges and correspond with the external threads.

2. The die stock as claimed in claim 1, wherein each of the clamping wedges, when being viewed from the first end face of the holder, tapers along the axial direction in a wedge-shaped manner and, starting from the inner side of the holder, widens along the radial direction outward in a wedge-shaped manner.

3. The die stock as claimed in claim 1, wherein, by tightening of the holding means, a self-locking force closure is created between the cutting inserts, the clamping wedges and the receiving grooves, respectively, which force closure fixes the cutting inserts axially and radially in the receiving grooves.

4. The die stock as claimed in claim 1, wherein the cutting inserts are differently configured.

5. The die stock as claimed in claim 4, wherein the cutting inserts have different cutting edge geometries, such that the cutting edges of the cutting inserts form different peripheral segments of a thread.

6. The die stock as claimed in claim 1, wherein each cutting insert has a chamfer, which is located in a region of the first end face of the holder when the cutting inserts are arranged in the holder, wherein normal vectors of the chamfers point toward the holder longitudinal axis and the chamfers lie on a common imaginary envelope cone.

7. The die stock as claimed in claim 1, wherein the receiving grooves are identical, and wherein each of the receiving grooves has a beating surface that runs transversely to the holder longitudinal axis, for supporting one of the cutting inserts, wherein the bearing surfaces are arranged at a same axial height, and wherein the cutting inserts are equal in length in the axial direction.

8. The die stock as claimed in claim 1, wherein the holder is of two-part construction, has a first holder part, in which the receiving grooves are provided, and has a second holder part, which serves to fasten the holder to a workpiece fixture and, with the aid of the screws, is fastenable to the first holder part.

9. The die stock as claimed in claim 8, further comprising at least one driving pin for connecting the first and the second holder part with each other, wherein the at least one driving pin is inserted in a precisely fitting manner in a through hole, running in the axial direction, in the holder.

10. A holder for a die stock, wherein the holder:

is substantially cylindrical and is symmetrical to a holder longitudinal axis that runs in an axial direction, has a plurality of receiving grooves, wherein each of the receiving grooves extends from a first end face of the holder in the axial direction, the first end face running transversely to the axial direction, wherein each of the receiving grooves extends from an inner side of the holder in a radial direction, the inner side facing toward the holder longitudinal axis, and wherein each of the receiving grooves, starting from the first end face of the holder, tapers along the axial direction in a wedge-shaped manner and, starting from the inner side of the holder, widens along the radial direction in a wedge-shaped manner with increasing distance from the holder longitudinal axis, a plurality of clamping wedges arranged detachably in the receiving grooves in order to axially and radially fix cutting inserts, wherein one clamping wedge is provided for each of the receiving grooves, respectively, wherein the clamping wedges may in a peripheral direction be arranged alongside the cutting inserts in each of the receiving grooves, respectively, the peripheral direction running transversely to the axial direction and the radial direction, and one screw per receiving groove, for fastening the clamping wedges in the receiving grooves, wherein each of the screws has an external thread and is insertable from a second end side of the holder into bores provided in the holder, the second end side being arranged opposite the first end side of the holder, wherein the screws are screwable to the clamping wedges via corresponding internal threads which are provided in the clamping wedges and correspond with the external threads.

* * * * *